US007831352B2

(12) United States Patent
Laumer et al.

(10) Patent No.: US 7,831,352 B2
(45) Date of Patent: Nov. 9, 2010

(54) HYDRAULIC ACTUATOR CONTROL SYSTEM

(75) Inventors: Steve P. Laumer, Maplewood, MN (US); Gary Lee Lagro, Rosemount, MN (US)

(73) Assignee: The Hartfiel Company, Eden Prairie, MN (US)

( * ) Notice: Subject to any disclaimer, the term of this patent is extended or adjusted under 35 U.S.C. 154(b) by 217 days.

(21) Appl. No.: 12/048,433

(22) Filed: Mar. 14, 2008

(65) Prior Publication Data

US 2008/0228323 A1 Sep. 18, 2008

Related U.S. Application Data

(60) Provisional application No. 60/895,150, filed on Mar. 16, 2007.

(51) Int. Cl.
*G06F 7/00* (2006.01)

(52) U.S. Cl. ......................... 701/36; 700/285; 700/282; 60/433; 414/408; 298/22 R; 701/50

(58) Field of Classification Search .................. 701/36, 701/50; 700/285, 282; 60/433; 298/22 R; 414/408, 572, 525.5
See application file for complete search history.

(56) References Cited

U.S. PATENT DOCUMENTS

| | | | | |
|---|---|---|---|---|
| 4,313,707 | A | 2/1982 | Bingman et al. | |
| 4,954,776 | A * | 9/1990 | Husher | 324/207.16 |
| 5,129,425 | A | 7/1992 | Howarth et al. | |
| 5,511,458 | A | 4/1996 | Kamata et al. | |
| 6,085,632 | A | 7/2000 | Stoll et al. | |
| 6,167,795 | B1 | 1/2001 | Bayne et al. | |
| 6,257,118 | B1 | 7/2001 | Wilbur et al. | |
| 6,589,007 | B2 | 7/2003 | Burton | |
| 6,963,796 | B2 * | 11/2005 | Larson et al. | 701/36 |

(Continued)

FOREIGN PATENT DOCUMENTS

DE 68912183 E * 2/1994

(Continued)

OTHER PUBLICATIONS

Design and control of a manipulator arm driven by pneumatic muscle actuators; Situm, Z.; Herceg, S.; Control and Automation, 2008 16th Mediterranean Conference on; Digital Object Identifier: 10.1109/MED.2008.4602136; Publication Year: 2008 , pp. 926-931.*

(Continued)

*Primary Examiner*—Cuong H Nguyen
(74) *Attorney, Agent, or Firm*—Pauly, DeVries Smith Deffner, L.L.C.

(57) ABSTRACT

A system for controlling motion of a hydraulic actuator during a portion of its range of motion is described, including a sensor on the hydraulic actuator for providing a signal indicating that the actuator is near a portion of its range of motion, and a pneumatic control valve that is configured to selectively modify a pressurized air control signal to in turn restrict flow of pressurized hydraulic fluid to the hydraulic actuator. The hydraulic actuator control system further includes an electronic controller for controlling the pneumatic control valve in response to a signal from the sensor. The hydraulic actuator control system thereby slows the motion of the hydraulic actuator near the portion of its range of motion.

13 Claims, 8 Drawing Sheets

U.S. PATENT DOCUMENTS

| | | | | |
|---|---|---|---|---|
| 7,059,126 | B2 | 6/2006 | Ma | |
| 7,070,381 | B2 | 7/2006 | Khan et al. | |
| 7,104,054 | B1 | 9/2006 | Dix | |
| 7,124,579 | B1 | 10/2006 | Gehlhoff | |
| 2002/0154973 | A1 | 10/2002 | Bradshaw et al. | |
| 2003/0163230 | A1* | 8/2003 | Pillar et al. | 701/1 |
| 2003/0171854 | A1* | 9/2003 | Pillar et al. | 701/1 |
| 2004/0002794 | A1* | 1/2004 | Pillar et al. | 701/1 |
| 2004/0045289 | A1 | 3/2004 | Ikeda et al. | |
| 2005/0065684 | A1* | 3/2005 | Larson et al. | 701/36 |
| 2005/0234622 | A1* | 10/2005 | Pillar et al. | 701/41 |
| 2006/0054434 | A1 | 3/2006 | Fukuda et al. | |
| 2006/0204352 | A1 | 9/2006 | Khan et al. | |
| 2006/0218915 | A1 | 10/2006 | Dix | |
| 2007/0061054 | A1* | 3/2007 | Rowe et al. | 701/1 |
| 2007/0159307 | A1 | 7/2007 | Jannasch et al. | |
| 2007/0173987 | A1* | 7/2007 | Rowe et al. | 701/2 |
| 2007/0185625 | A1* | 8/2007 | Pillar et al. | 701/1 |
| 2008/0004777 | A1* | 1/2008 | Quigley | 701/50 |
| 2008/0071429 | A1* | 3/2008 | Kraimer et al. | 701/2 |
| 2008/0109131 | A1* | 5/2008 | Pillar et al. | 701/36 |
| 2008/0114513 | A1* | 5/2008 | Pillar et al. | 701/41 |
| 2008/0140253 | A1* | 6/2008 | Brown | 700/245 |
| 2008/0215190 | A1* | 9/2008 | Pillar et al. | 701/1 |
| 2008/0221754 | A1* | 9/2008 | Rowe et al. | 701/36 |
| 2008/0228323 | A1* | 9/2008 | Laumer et al. | 700/285 |
| 2009/0306863 | A1* | 12/2009 | Curotto et al. | 701/50 |

FOREIGN PATENT DOCUMENTS

| | | | | |
|---|---|---|---|---|
| EP | 63177 | A1 | * | 10/1982 |
| EP | 339759 | A | * | 11/1989 |
| EP | 339759 | B1 | * | 1/1994 |
| KR | 2008033194 | A | * | 4/2008 |

OTHER PUBLICATIONS

Multiplexed hydraulic valve actuation using ionic liquid filled soft channels and Braille displays; Gu, Wei; Chen, Hao; Tung, Yi-Chung; Meiners, Jens-Christian; Takayama, Shuichi; Applied Physics Letters ; vol. 90 , Issue: 3; Digital Object Identifier: 10.1063/1.2431771; Publication Year: 2007 , pp. 033505-033505-3.*

High stiffness pneumatic actuating scheme and improved position control strategy realization of a pneumatic climbing robot Zhang, H.X. et al..;Robotics and Biomimetics, 2008. ROBIO 2008. IEEE International Conference on; Digital Object Identifier: 10.1109/ROBIO.2009.4913276; Publication Year: 2009 , pp. 1806-1811.*

Optimal linearization of the dynamic behavior of an on/off actuated single pneumatic cylinder; Rosas-Flores, J.A. et al..; Electrical Engineering, Computing Science and Automatic Control, 2008. CCE 2008. 5th International Conference on; Digital Object Identifier: 10.1109/ICEEE.2008.4723441; Publication Year: 2008, pp. 380-385.*

Control of a direct-drive servo-valve actuated by a linear amplified piezoelectric actuator for aeronautic applications; Sente, P.; Vloebergh, C.; Labrique, F.; Alexandre, P.; Electrical Machines, 2008. ICEM 2008. 18th International Conference on Digital Object Identifier: 10.1109/ICELMACH.2008.4800093; Publication Year: 2008 , pp. 1-6.*

Fabrication of all PDMS micro pump; Jeong, O.C.; Konishi, S.; Micro-NanoMechatronics and Human Science, 2005 IEEE International Symposium on; Digital Object Identifier: 10.1109/MHS.2005.1589977; Publication Year: 2005 , pp. 139-143.*

Height frequency electro-hydraulic vibration exciter with 2D valve;Xu Zibin et al.; Systems and Control in Aerospace and Astronautics, 2008. ISSCAA 2008. 2nd International Symposium on; Digital Object Identifier: 10.1109/ISSCAA.2008.4776406 Publication Year: 2008 , pp. 1-4.*

* cited by examiner

HYDRAULIC ACTUATOR CONTROL SYSTEM

RELATED APPLICATIONS

This application is a non-provisional application of U.S. Provisional Application No. 60/895,150, filed Mar. 16, 2007, the entire contents of the U.S. application is incorporated herein by reference.

FIELD OF THE INVENTION

The invention relates to control systems for hydraulic actuators, and more particularly, to the control of hydraulic actuators at certain positions in their range of travel.

BACKGROUND OF THE INVENTION

To increase the efficiency of refuse collection, many refuse collection companies use automated refuse loaders that lift a refuse container and then dump the refuse container into a refuse collection vehicle. Such automated refuse loaders can service a significantly higher number of customers in a given time period when compared with manually placing refuse into the refuse collection vehicle. This increased efficiency can result in substantially lower refuse collection costs. However, there are various challenges associated with the use of automated refuse loaders. For example, it is desired that the refuse loader mechanism operate as fast as possible to reduce cycle times and increase productivity. However, when a refuse loader mechanism operates at high speed, large forces will be created if the mechanism suddenly comes to a stop or change direction. These forces can be very large, particularly when the loader mechanism is lifting a dumpster or other refuse container that can weigh in excess of several tons. These large forces can result in large stresses within mechanical components, leading to breakage, failure, or accelerated wear of components, or can result in pressure spikes in hydraulic components, also leading to breakage and failure of components.

One circumstance in which a refuse loader mechanism can suddenly come to a stop is when the mechanism reaches one of the ends of its range of travel. For example, in some refuse loader mechanisms, the range of travel is defined by stops or other components placed in the path of the mechanism to cause it to stop moving. These are often rigid components that cause the mechanism to stop rapidly upon striking the component. Some mechanisms are controlled by hydraulic actuators such as hydraulic cylinders, and where the range of travel is defined by the range of travel of the hydraulic cylinder. For example, when a piston inside of a hydraulic cylinder reaches either end of its stroke, the piston and its attached piston rod will rapidly come to a stop. In any case, rapidly stopping a refuse loader mechanism, and thereby also rapidly stopping whatever load the mechanism is carrying, can cause significant forces to be imparted to the mechanism and the rest of the machine. Other types of hydraulic actuators, such as rotary hydraulic actuators, also have a range of travel, and can also cause significant forces to be imparted to the mechanism and the rest of the machine if they are brought to a rapid stop. These loads can cause components to crack, welds to break, and bearings or bushings to wear out.

Another circumstance that can cause significant wear and tear on a refuse collection vehicle is when a lifting apparatus travels through a path that changes direction. For example, in some refuse collection vehicles, tracks for a lifting mechanism have a shape like a candy cane, with a tight turn at the top of the track. It is desired to reduce the shocks associated with the change in direction travel of the lifting apparatus.

There have been various systems proposed to reduce shocks associated with hydraulic cylinders approaching an end of their range of travel. One such system involves the use of hydraulic cushions within the hydraulic cylinder. These cushions generally function by creating a restricted flow path for hydraulic fluid to escape as the cylinder nears the end of its stroke, such that the trapped hydraulic fluid must be forced through a restriction and thereby slowing the motion of the cylinder. Furthermore, various mechanical devices have been adapted to the exterior of cylinders to dampen their motion near the end of their stroke, such as shock absorbers or mechanical kick-outs where a rod or linkage kicks out a hydraulic control valve as the cylinder approaches the end of its range of travel. However, the performance of these devices is often not optimum, because they may still allow a significant amount of shock in the system and are difficult to optimize for all conditions.

Other techniques have been used to control the speed of a hydraulic cylinder near the end of its stroke. One approach is the use of proportional electro-hydraulic control. This generally involves the use of one or more electrical solenoid valves to directly position a hydraulic control spool valve. An electrical signal can be sent to a solenoid valve to change the position of the hydraulic spool valve when the cylinder nears the end of its travel, causing the flow rate to the cylinder to be reduced and therefore causing the cylinder to slow before reaching its end of travel. However, systems of this construction tend to be expensive, because of the number of high precision components required. Moreover, these high precision components require close attention to maintenance practices and can more readily by damaged by contamination. Their intricate nature also renders them more difficult to service and repair, requiring greater levels of skill in maintenance personnel which can result in higher maintenance costs.

Improved systems for controlling motion of loader mechanisms on refuse collection vehicles are needed.

SUMMARY OF THE INVENTION

One embodiment of the invention is to a system for controlling motion of a hydraulic actuator during a portion of its range of motion. The system includes a sensor on the hydraulic actuator for providing a signal indicating that the actuator is near the portion of its range of motion, and a pneumatic control valve that is configured to selectively modify a pressurized air control signal to in turn restrict flow of pressurized hydraulic fluid to the hydraulic actuator. The hydraulic actuator control system further includes an electronic controller for controlling the pneumatic control valve in response to a signal from the sensor. The hydraulic actuator control system thereby slows the motion of the hydraulic actuator near the portion of its range of motion.

A second embodiment relates to a hydraulic cylinder control system. The hydraulic cylinder control system includes a hydraulic cylinder that is configured to move through a range of operation, the hydraulic cylinder having at least one end of stroke portion. The system also includes an operator control for controlling motion of the hydraulic cylinder actuator, the operator control configured to direct pressurized air to one or more pneumatic actuators for selectively actuating a hydraulic control valve in response to motion of the operator control, where the hydraulic control valve is configured to selectively connect the source of pressurized hydraulic fluid to the hydraulic linear actuator to cause motion of the hydraulic cylinder. In addition, the system includes a position sensor that is configured to sense the position of the hydraulic linear actuator and to transmit a signal related to the position and one or more pneumatic control valves that are fluidly connected between the operator control and a pneumatic actuator. Each pneumatic control valve is configured to selectively release pressurized air from the operator control to the pneumatic actuator in response to an electrical signal. The hydraulic actuator control system further includes an electronic controller that is configured to receive the signal from the position sensor, and when the signal indicates that the hydraulic linear actuator is near an end of stroke portion, it is configured to selectively actuate the pneumatic control valve to cause the hydraulic cylinder actuator to travel more slowly until reaching the end position.

A third embodiment relates to a mobile refuse collection vehicle. The mobile refuse collection vehicle includes a source of pressurized hydraulic fluid and a source of pressurized air, as well as a lifter apparatus that is configured to interface with a refuse container. The vehicle further includes a hydraulic actuator that is configured to move the lifter apparatus through a range of operation. An operator control is also provided for controlling motion of the hydraulic actuator, the operator control being configured to selectively connect the source of pressurized air to one or more pneumatic actuators for selectively actuating a hydraulic control valve in response to motion of the operator control, the hydraulic control valve being configured to selectively connect the source of pressurized hydraulic fluid to the hydraulic linear actuator to cause motion of the hydraulic linear actuator. Furthermore, the mobile refuse collection vehicle also includes a position sensor configured to sense the position of the hydraulic linear actuator and to transmit a signal related to the position, and one or more pneumatic control valves that are fluidly connected between the operator control and a pneumatic actuator, where each pneumatic control valve is configured to selectively release pressurized air from the operator control to the pneumatic actuator in response to an electrical signal. Additionally, there is an electronic controller that is configured to receive the signal from the position sensor, and when the signal indicates that the hydraulic actuator is near a first position the controller is also configured to selectively actuate the pneumatic control valve to cause the hydraulic linear actuator to travel more slowly until reaching the first position.

The invention may be more completely understood by considering the detailed description of various embodiments of the invention that follows in connection with the accompanying drawings.

Figure 1:
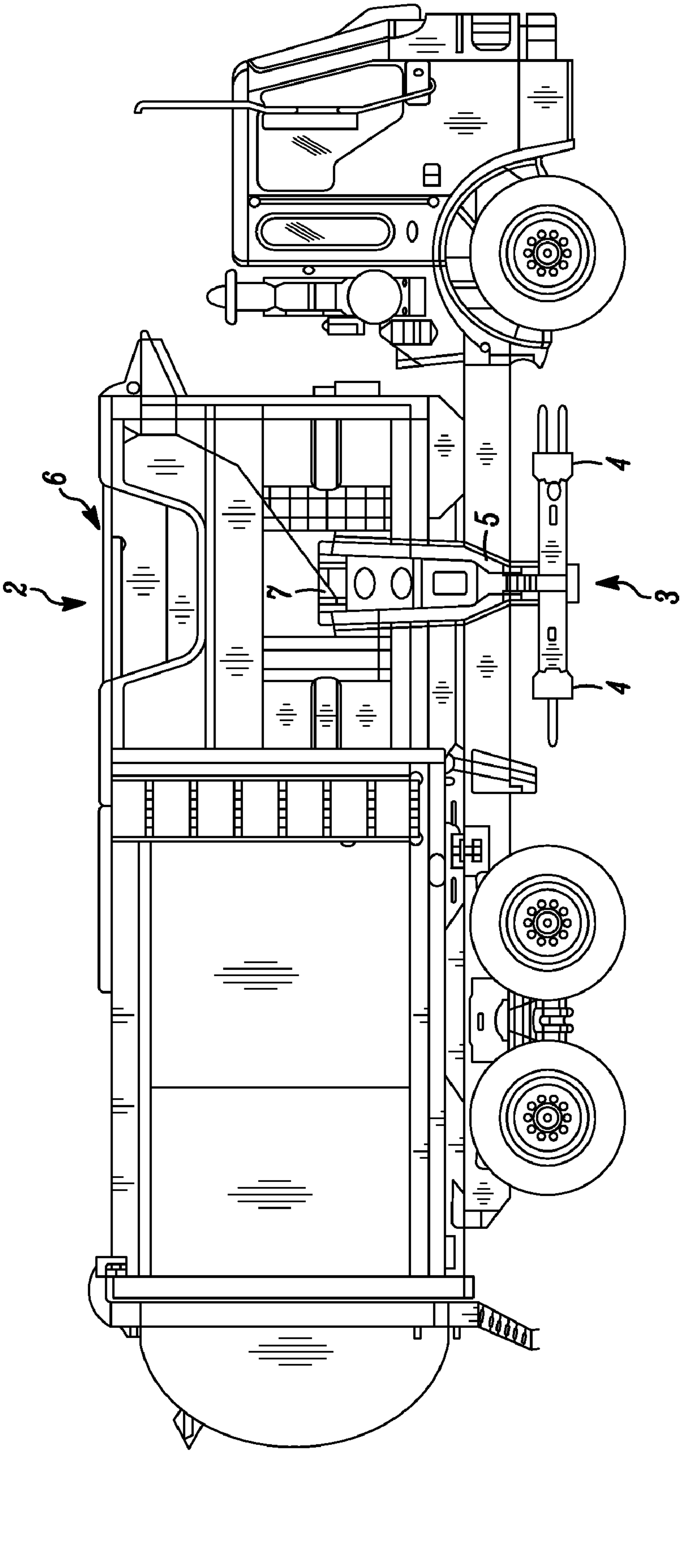
FIG. 1 is a side view of a side-loading refuse collection vehicle in which a hydraulic actuator control system according to the principles of the present invention is utilized.

While the invention may be modified in many ways, specifics have been shown by way of example in the drawings and will be described in detail. It should be understood, however, that the intention is not to limit the invention to the particular embodiments described. On the contrary, the intention is to cover all modifications, equivalents, and alternatives following within the scope and spirit of the invention as defined by the claims.

DETAILED DESCRIPTION OF THE INVENTION

The present disclosure relates to a hydraulic actuator control system that reduces impact forces when a mechanism reaches certain points of its range of travel, such as when a hydraulic actuator nears the end of its range of travel. The hydraulic actuator control system can be adapted for use in a variety of applications. One particularly useful application is to decelerate the movement of a lifting mechanism of a refuse collection vehicle as it reaches the end of its range of travel or as it changes direction.

For example, FIG. 1 depicts a side-loading refuse collection vehicle 2 that has a side loader refuse loader mechanism 3 that is used with various embodiments of the hydraulic control system described herein. The side loader mechanism 3 includes two grabber arms 4, which rotate toward each other to close around a garbage container. A loader arm 5 of the side loader mechanism 3 then lifts the garbage container upward toward a hopper opening 6 of the vehicle, rotating about a loader arm pivot point 7.

The loader arm 5 has a range of motion extending from its position pointing downward as shown in FIG. 1 through an upwardly pointing position. A hydraulic actuator moves the loader arm through its range of motion. In various embodiments, the hydraulic actuator is a hydraulic cylinder attached to the loader arm to cause it to rotate about a pivot point or a hydraulic rotary actuator. When the loader arm 5 reaches its uppermost position and lowermost position, large forces are placed upon the loader arm, pivot point and other parts of the vehicle as the loader arm comes to a stop. Various embodiments of the hydraulic control system of this invention are used to reduce the loads at these parts of the range of motion of the loader arm 5. By slowing the movement of the loader arm as it approaches these points, the destructive forces are reduced.

Figure 2:
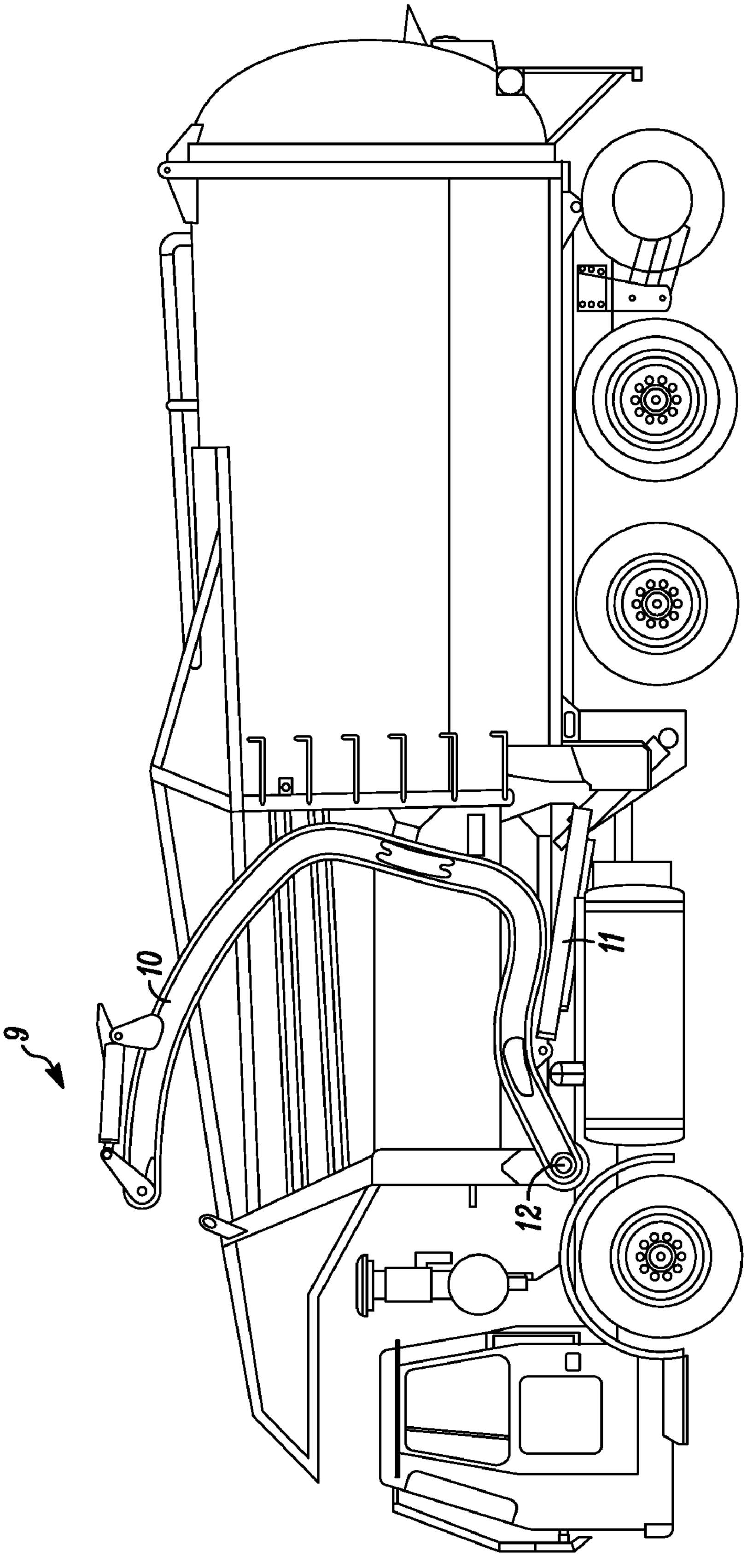
FIG. 2 is a side view of a front-loading refuse collection vehicle in which a hydraulic actuator control system according to the principles of the present invention is utilized.

Other refuse collection vehicles could also be used, such as front loader refuse collection vehicles or rear loader refuse collection vehicles. FIG. 2 is a side view of a front loading refuse collection vehicle 9 in which a hydraulic actuator control system according to the principles of the present invention is utilized. The front loading vehicle 9 includes a front loader mechanism 10 that is moved by a hydraulic cylinder 11 and pivots about a pivot point 12.

The front loading mechanism 10 travels through a range of motion to lift a garbage container, such as a dumpster, from a first position on the ground in front of the front loading vehicle. As the front loading mechanism 10 rotates about the pivot point 12, the garbage container is carried along with the motion of the front loading mechanism to a second position where the container is upside-down above a hopper opening of the vehicle. The second position of the front loading mechanism is shown in FIG. 2, although the container is not shown.

When the front loader mechanism 10 comes to a stop at its uppermost position and lowermost position, large forces are placed upon the loader mechanism 10, pivot point 12 and other parts of the vehicle as the loader mechanism comes to a stop. Various embodiments of the hydraulic control system of this invention are used to reduce the loads at these parts of the range of motion of the loader mechanism 10. By slowing the movement of the loader mechanism as it approaches these points, the destructive forces are reduced.

Figure 3:
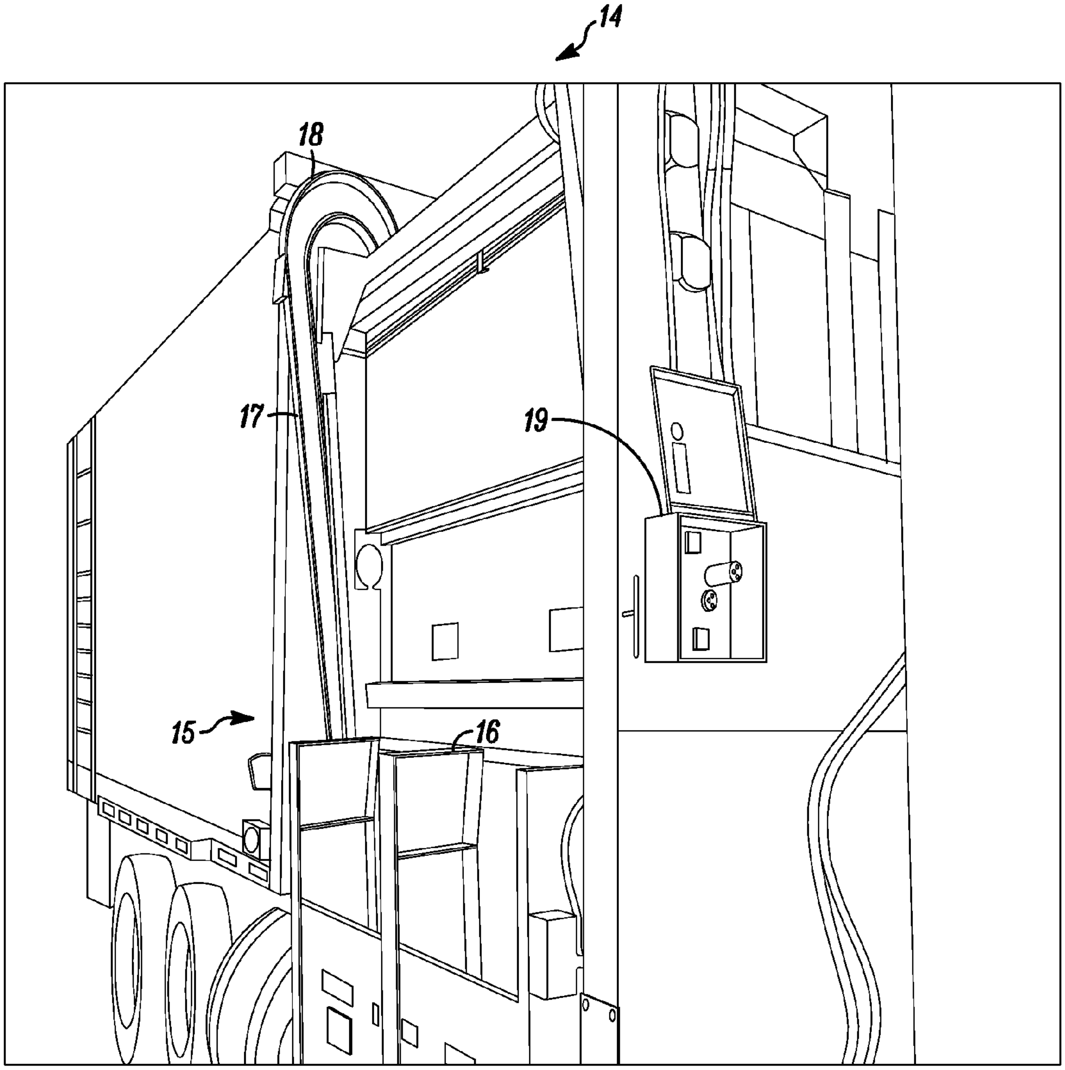
FIG. 3 is a side perspective view of a different side-loading refuse collection vehicle, particularly suited for recycling collection, in which a hydraulic actuator control system according to the principles of the present invention is utilized.

FIG. 3 is a side perspective view of a different side-loading refuse collection vehicle 14, particularly suited for recycling collection, in which a hydraulic actuator control system is used. A side loader mechanism 15 includes collection bins 16 which ride along a track 17 upward to be dumped into a hopper opening of the vehicle. The track 17 includes a sharply curved section 18, so that the track has a shape like a candy cane. As the collection bins ride upward along the track, they are inverted by the curved section 18 to dump into the vehicle's hopper. A box containing a hydraulic actuator control system 19 is attached to a side of the vehicle 14.

When the collection bins 16 travel through the curved section 18, large forces are placed upon the hydraulic cylinder, the track, the connections between the hydraulic cylinder and the collection bins, and other parts of the vehicle. The hydraulic actuator control system 19 slows the movement of the collection bins as they travel through these points along the range of motion, thereby reducing the damaging forces.

Furthermore, hydraulic actuators and cylinders are used in a wide variety of machines and equipment and the hydraulic actuator control system of the present invention could readily be adapted for use therewith.

Figure 4:
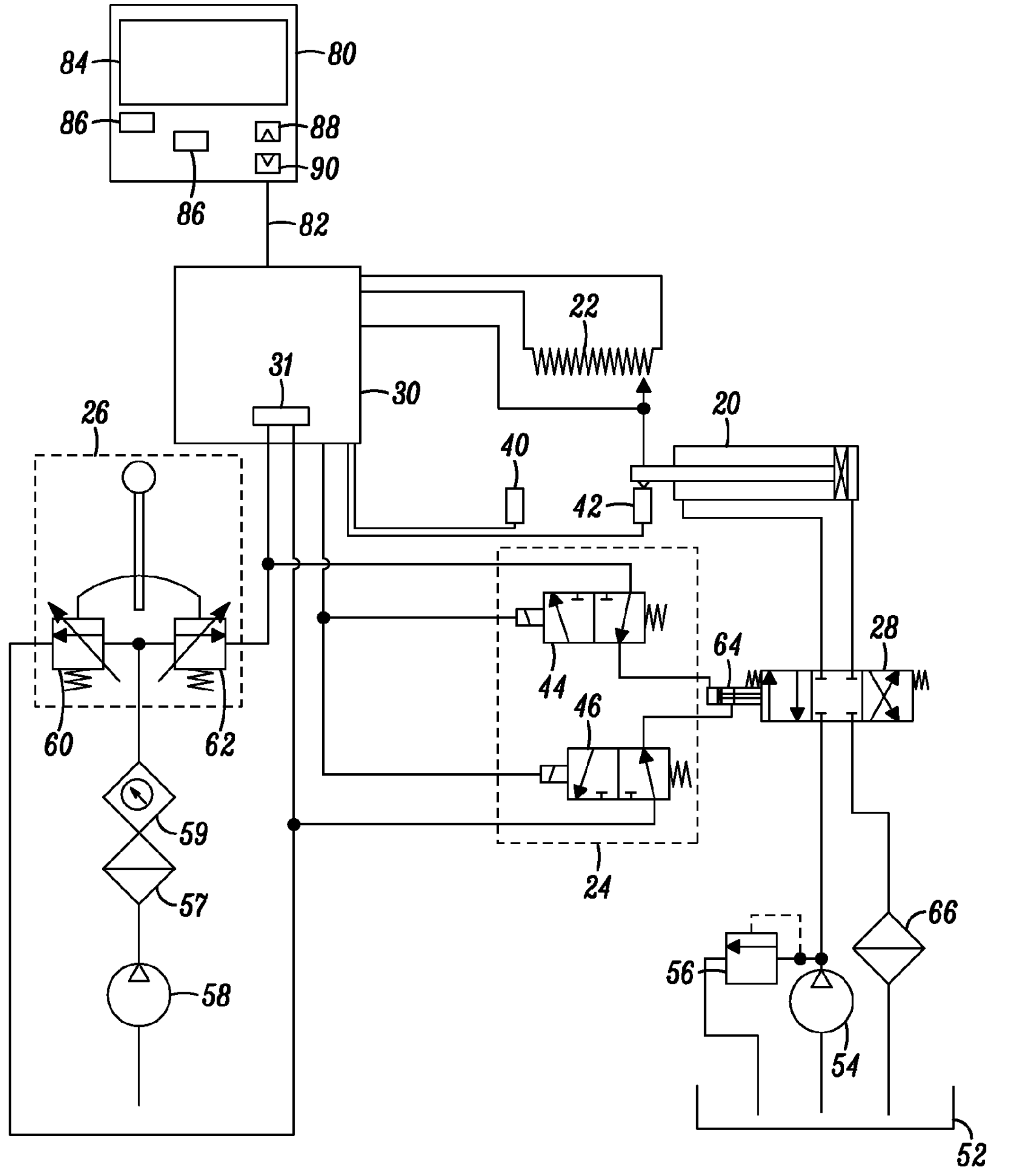
FIG. 4 is a hydraulic, pneumatic and electronic schematic of a hydraulic actuator control system constructed according to the principles of the present invention.

FIG. 4 depicts schematically a hydraulic actuator control system 19 constructed according to the principles of the present invention. The hydraulic actuator control system 19 generally includes a hydraulic actuator, which is a hydraulic cylinder 20 in this example, a position sensor 22, a pneumatic valve system 24, an operator control mechanism 26, a pneumatically operated hydraulic valve 28, and a controller 30. In operation, a hydraulic fluid reservoir 52 contains a volume of hydraulic fluid. Pump 54 draws hydraulic fluid from reservoir 52 and generates a flow of hydraulic fluid. Pressure relief valve 56 is in communication with the outlet of pump 54 and serves to set the maximum hydraulic pressure in the system. If the hydraulic pressure in the system exceeds the setting of relief valve 56, excess hydraulic fluid is returned to reservoir 52 until the pressure in the hydraulic system is below the relief valve setting. Hydraulic oil from the pump 54 is further in communication with hydraulic control valve 28, which is shown as a spring-centered spool valve. Hydraulic control valve 28 is also shown as a closed center valve; however, an open center hydraulic system is equally usable. Likewise, a variable displacement pump 54 may be used, particularly in conjunction with a closed center hydraulic system.

A pneumatic control system is further provided for controlling the motion of hydraulic cylinder 20. An air compressor 58 is provided as a source of pressurized air. This pressurized air enters operator control mechanism 26. In embodiments where the hydraulic control system is working on a vehicle, the vehicle typically has a source of pressurized air that is shared and utilized by several different systems, such as the loading system, compaction system and the air brakes. Varying demands for pressurized air can cause swings in the air pressure within the vehicles system. Such swings could cause imprecision in the control of the hydraulic valve using a pneumatic control system. To address this concern, an air pressure regulator 59 is used to provide a constant minimum pressure to the hydraulic actuator control system 19, regardless of compensator settings on the vehicle's compressor system. The constant minimum air pressure for the hydraulic control system is lower than the air pressure that is maintained for the remainder of the vehicle's systems. In one example, the air pressure provided by the vehicle's source is 100 psi, and the regulator 59 ensures that the pressure in the hydraulic actuator control system is 90 psi. A filter 57 is also included in the pneumatic line.

The operator control mechanism 26 includes a lever or joystick 50, which is spring-centered to a neutral position in which no pressurized air flows through the control mechanism 26. However, when the operator desires to cause the hydraulic cylinder to move, the operator moves lever 50. Depending on the direction in which lever 50 is moved, either valve 60 or 62 will open to allow pressurized air to flow through. The direction in which lever 50 is moved will thereby control the direction in which the hydraulic cylinder moves.

The distance that the lever 50 is moved determines the air pressure of the air downstream of the control mechanism 26. If the lever is moved the full distance possible in one direction, air will flow through valve 60 or 62 at the full pressure available, for example, 90 psi. If the lever is moved half of the possible distance in one direction, air at half of the available pressure flows through valve 60 or 62, for example 45 psi. In another embodiment, the lever 50 is a three position switch having up, down or off positions.

Pneumatically downstream from the operator control mechanism 26 is the pneumatic valve system 24 and the controller 30. The pneumatic lines from the operator control mechanism 26 each split into two lines, where one line travels to the controller 30 and the other travels to the pneumatic valve system 26. The pneumatic lines to the controller 30 are input to a transducer 31 which outputs an electrical signal representative of the air pressure and direction of airflow output by the operator control mechanism 28. This information will be used by the controller 30 to control the pneumatic valve system 26, which in turn controls the hydraulic control valve 28, as further described herein.

As depicted in FIG. 4, the pneumatic valve system 24 includes first pneumatic valve 44 and second pneumatic valve 46. Each of first and second pneumatic valves 44, 46 is normally spring-biased to a straight through flow position. However, first and second pneumatic valves 44, 46 each include a solenoid that is capable of shifting the position of the valve against the spring bias.

When an electrical current is applied to the solenoid, which is provided by the controller 30 when it is desired to slow the movement of the hydraulic actuator, each of first and second pneumatic valves 44, 46 cause the downstream pneumatic lines to be vented to the atmosphere, thereby tending to reduce the pressure in the downstream pneumatic lines. When the current is removed and the valve coil is released, the pressure from the lever 50 refills the downstream pneumatic operator. By choosing the proper rate of fill and vent, the controller 30 generates a reduced alternate downstream pressure, and therefore a corresponding modified flow, which is usually a reduced flow in the hydraulic actuator. The pneumatic valves 44, 46 are configured to be relatively fast-acting valves, such that they can be alternately positioned between a shifted and an unshifted position at least several times per second.

Pressurized air downstream of first and second pneumatic valves 44, 46 is directed to act on a pneumatic actuator 64 that controls the position of hydraulic valve 28. For example, when lever 50 is moved by the operator to cause pressurized air to flow through valve 60, and when the first pneumatic valve 44 is in an unshifted (unvented) position, pressurized air will flow to the pneumatic actuator 64 to cause the spool of hydraulic valve 28 to shift against the far, opposing spring. As depicted in FIG. 4, this will cause pressurized oil to flow through the hydraulic valve 28 and enter the rod end of the hydraulic cylinder 20, causing the hydraulic cylinder to retract. Similarly, if the operator moves lever 50 to cause pressurized air to flow through valve 62, and assuming that second pneumatic valve 46 is in an unshifted (unvented) position, then pressurized air will flow to the opposite side of pneumatic actuator 64 to cause the spool of hydraulic valve 20 to shift against the near spring. This will cause pressurized oil to flow through the hydraulic valve 28 and enter the piston end of the hydraulic cylinder 20, causing the hydraulic cylinder to extend.

The degree to which the lever 50 is moved from its center position will determine the air pressure of the air flow through 21, and will therefore determine if and the rate at which the cylinder is retracted or extended. In either position of the hydraulic valve 28, the end of the hydraulic cylinder that is opposite to the end where pressurized oil is applied will be connected to the reservoir as shown in FIG. 4. A filter 66 is shown in the return line to the reservoir to remove contaminants.

A position sensor 22 provides one or more signals indicative of the position of the hydraulic cylinder 20. In the depicted embodiment, position sensor 22 includes a first sensor 40 and a second sensor 42, where each of first and second sensors 40, 42 are proximity sensors that provide a signal indicative of the hydraulic cylinder being at a particular position. Other types of position sensors are usable. For example, a linear displacement sensor may be used that provides a signal representative of the position of the cylinder across the entire range of motion of the cylinder.

In place of a hydraulic cylinder, a hydraulic rotary actuator may be used. For example, a helical rotary hydraulic actuator is useable, such as a helical sliding spline actuator available from Helac Corporation of Enumclaw, Wash.

Alternative sensors include an encoder pulse sensor which converts the rotary position of a shaft to a code, which would be particularly appropriate for use with a hydraulic rotary actuator. Other alternative sensors for use with either a hydraulic rotary actuator or a hydraulic linear actuator include a resolver and a magneto-resistive sensor.

In any case, position sensor 22 provides one or more signals to a controller 30. In one embodiment, controller 30 includes electronic circuitry for receiving signals from position sensor 22 and for determining when a hydraulic actuator 20 is at a point in its range of travel where slowing is desired. The controller is further configured to provide an electrical signal to one of first or second pneumatic valves 44, 46 in response to a determination that hydraulic cylinder 20 is such a point. Various control schemes may be incorporated into controller 30.

When controller 30 sends a signal to one of first or second pneumatic valves 44, 46, the respective valve 44, 46 will open and cause the pneumatic line to be vented to the atmosphere. When the current is removed and the valve coil is released, the pressure from the lever 50 refills the downstream pneumatic operator. By choosing the proper rate of fill and vent, the device generates a modified or reduced alternate downstream pressure, and therefore a corresponding reduced flow. This will cause the pressure to drop in the pneumatic line, as well as within pneumatic actuator 64. As pressure drops within pneumatic actuator 64, the springs that bias the spool of hydraulic valve 28 will tend to push the spool toward the center position, thereby tending to restrict the flow of pressurized oil from the hydraulic pump to whichever end of the hydraulic cylinder was being pressurized. This restriction will cause hydraulic fluid to flow through hydraulic control valve 28 at a lower rate, causing the hydraulic cylinder motion to slow.

Controller 30 generally provides a signal to one of first or second pneumatic valves 44, 46 that alternately shifts and releases the respective valve. If the valve 44, 46 is held in the shifted position, it will rather quickly drain all of the pressurized air from the pneumatic lines and discharge it to the atmosphere. In this case, the hydraulic control valve 28 will return to its spring centered position, and the system will act as though the operator was not moving lever 50. However, by alternately and rapidly energizing and de-energizing the solenoid on first or second pneumatic valves 44, 46, the pressure within the pneumatic lines can be controlled to a level lower than what is being commanded by the operator through the operator control 26. The amount of pressure reduction will be a function of the amount of time that the first or second pneumatic valve 44, 46 is held open versus the amount of time that it is allowed to close.

Figure 5:
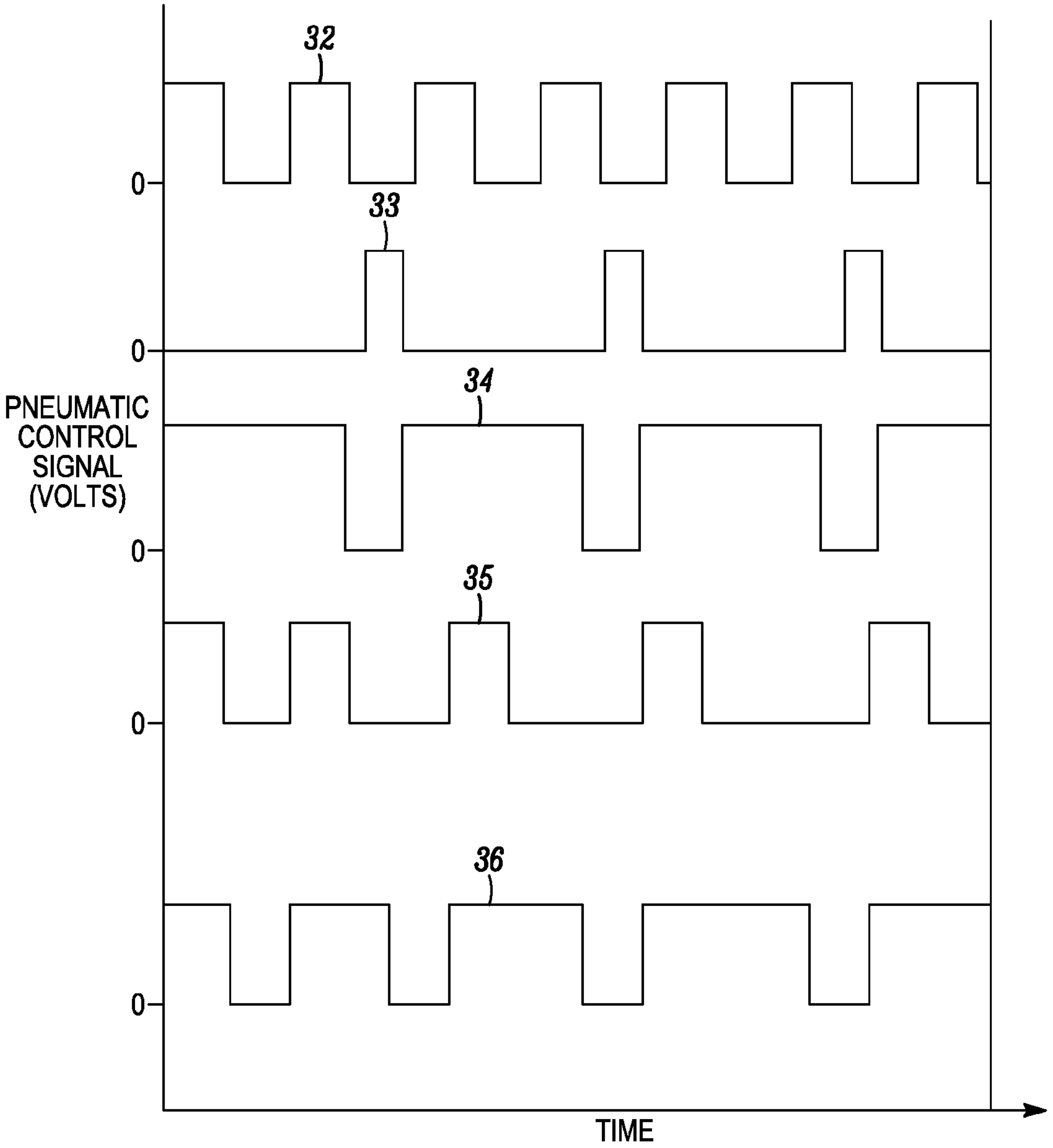
FIG. 5 depicts a variety of control signals sent by a controller to a pneumatic control valve.

A representation of typical profiles of the signals that are sent by controller 30 to first or second pneumatic valves 44, 46 is shown in FIG. 5. In the first profile 32, it can be observed that the energizing signal alternates between being energized and being de-energized. When the signal is de-energized or at zero, the pneumatic valves 44, 46 are in their normal straight through flow position, and the air pressure from the joystick 26 is not modified. When the signal is energized or is above zero, the pneumatic valves are vented, thereby releasing the air pressure, thereby reducing the air pressure in the pneumatic actuator 28, thereby slowing the movement of the hydraulic cylinder. The second profile 33 depicts an energizing signal that is expected to result in a smaller reduction of pressure in the pneumatic lines compared to the first profile 32 because the valve is opened for a shorter percentage of time. Alternately, the third profile 34 is one that is expected to result in a larger reduction of pressure in the pneumatic lines compared to the top profile because the valve is opened for a larger percentage of time.

The signal control can involve more than just modulation of the pulse width, because the amount of time between pulses can also be modulated to affect the pressure reduction in the pneumatic lines. This signal control strategy can be referred to as variable pulse-width modulation. The fourth profile 35 depicts an energizing signal where the width of the pulses remains constant, but the time between energizing pulses increases over the time window. The fifth profile 36 depicts an energizing signal where the width of the energizing pulses gradually increases over the time window. The profile is achieved using a decay parameter.

Figure 6:
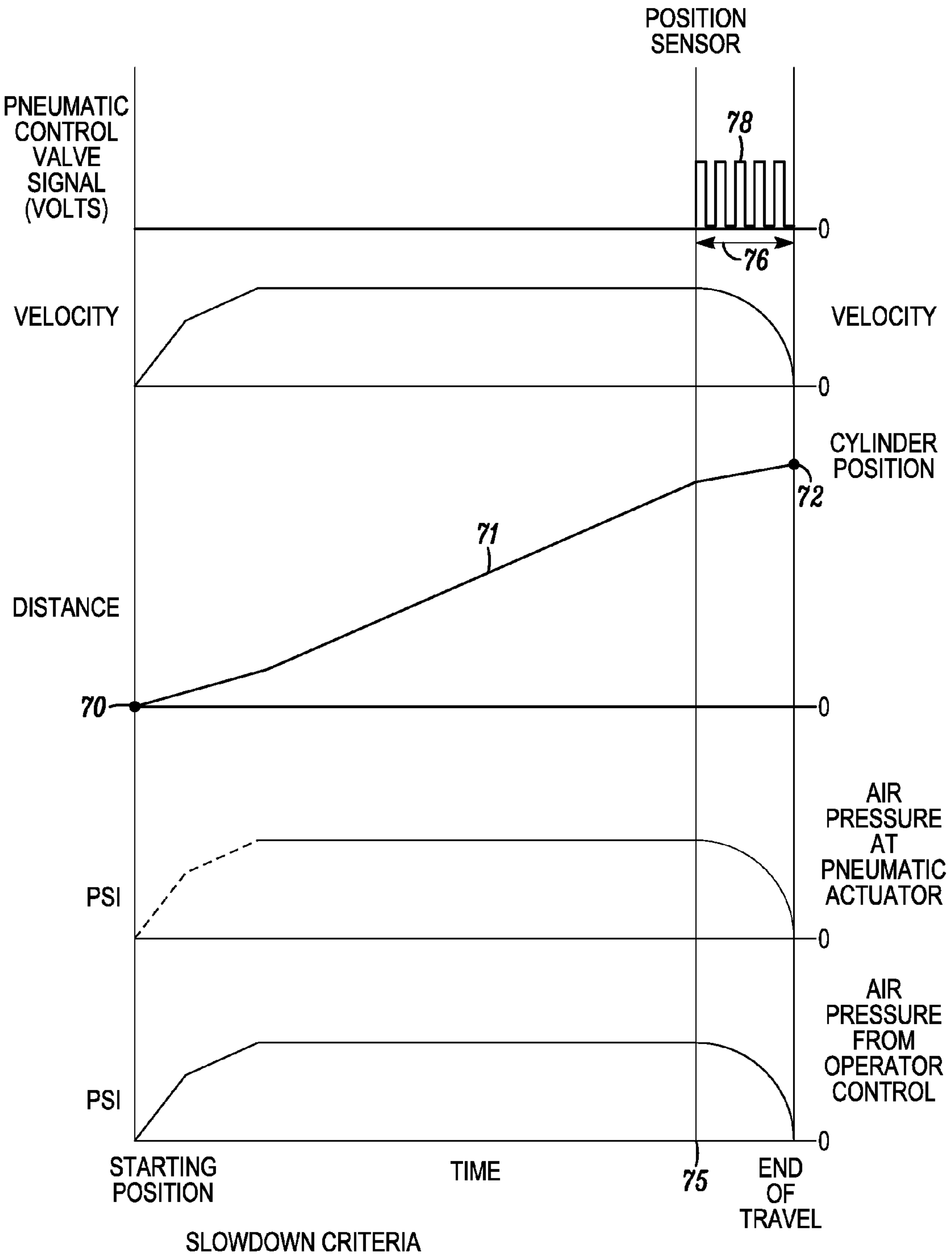
FIG. 6 is a chart that simultaneously depicts several operating characteristics of a hydraulic actuator control system.

FIG. 6 shows the operating characteristics of one embodiment of a hydraulic cylinder control system constructed according to the principles of the present invention. The operating characteristics are plotted on a uniform time scale, so that the different characteristics of operation can be seen simultaneously. The cylinder position begins at a starting position 70. The operator control commands an air pressure that initially rises but then maintains a steady value that is a function of the pressure developed by the air regulator 59. The air pressure is approximately equal to the air pressure at the pneumatic actuator, causing the hydraulic control valve 28 to shift to direct hydraulic fluid to cause the cylinder to move with a velocity that is generally defined by the flow rate of the pump, the size of the cylinder, and fluid flow losses in the system. In a standard hydraulic cylinder system without the control system of the present invention, this operation continues until the cylinder reaches the end of its range of motion. However, in a hydraulic cylinder system according to the invention, operation continues until the signal from the position sensor indicates to the controller 30 that the cylinder is near the end of its range of motion at window 76. A time marker 75 in FIG. 6 indicates when the position sensor provides this signal. At this point, the controller begins signaling the pneumatic control valve to alternately release and hold the pressurized air, as shown by pulsed profile 78. The signal profiles 32-36 shown in FIG. 5 are examples of how the pneumatic valve can be controlled by the controller. As can be seen in FIG. 6, this pulsed signal causes the air pressure at the pneumatic actuator to decrease at a controlled rate, which in turn causes the hydraulic control valve 28 to partially return to its centered position, and this restriction in the hydraulic fluid causes the velocity of the hydraulic cylinder to decrease. It can be noted that the air pressure transmitted from the operator control is not affected, but rather only the air pressure at the pneumatic actuator is reduced. By the time the hydraulic cylinder reaches the end of its range of travel, the hydraulic cylinder velocity is low. Accordingly, the impact forces generated by the hydraulic cylinder impacting against the end of its range of travel are minimized.

Control Schemes and Parameter Settings

Figure 7:
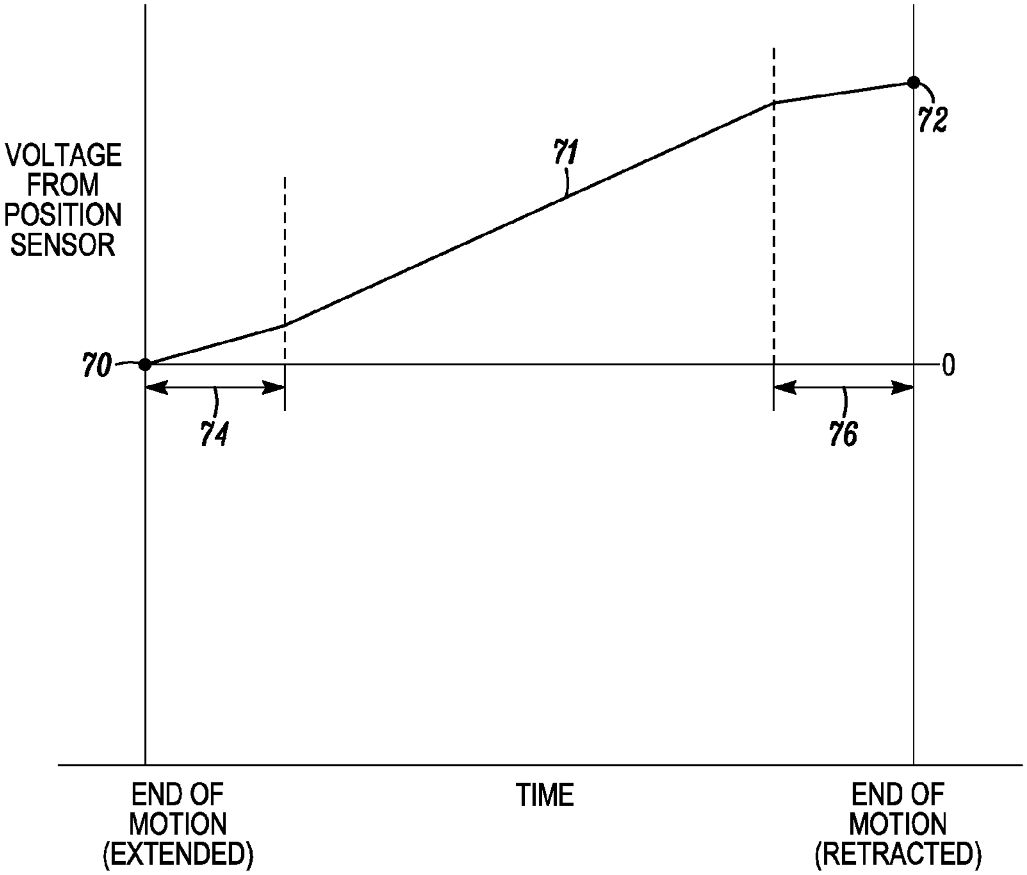
FIG. 7 depicts a sensor signal and various parameters associated therewith.

A variety of control schemes are usable for the signals that are sent from the controller 30 to the first and second pneumatic control valves 44, 46. One such usable scheme involves using a linear resistive sensor to provide a hydraulic cylinder position signal throughout its range of motion. For example, as shown in FIG. 7, the sensor may provide a linear voltage profile 71 throughout the range of motion of the hydraulic cylinder. In some embodiments, the linear resistive sensor is calibrated by placing the hydraulic cylinder at one end of its range of motion and providing a calibration input to the controller that tells the controller to use the voltage from the sensor at that position as representative of the full range position of the cylinder. In FIGS. 6-7, this is indicated as point 70. This procedure would then be repeated for the other end of the range of motion of the cylinder, thereby allowing the controller to know the sensor voltage signal that will correspond to the fully extended and fully retracted portions of the range of motion of the hydraulic cylinder. In FIGS. 6-7, the other point is indicated as point 72.

In various embodiments, this control scheme further involves defining a variety of parameters which influence the control signal provided to the pneumatic valve system 24

Other parameters used in the control scheme include the amount of time that the pneumatic control valves are energized and the amount of time that they are not energized prior to being energized again. These parameters will tend to control the degree of pressure reduction associated with the pneumatic control valves. The time when the pneumatic control valves are not energized can be called the fill time, and the time when the pneumatic control valves are energized can be called the vent time. Typically, there are different fill time and vent time parameter settings for the upward direction of the loading mechanism and the downward direction of the loading mechanism. As a result, a parameter setting is entered for up fill time, up vent time, down fill time and down vent time, typically in milliseconds. For the vehicles described herein, values for these parameters can range from only 2 milliseconds to 100 milliseconds, though each system will require its own determination and adjustment of parameters.

Another parameter setting determines the number of total pulse cycles that occur after the sensor indicates that the hydraulic cylinder is reaching a point in its range of travel where its speed should be slowed. A different setting is entered for the number of pulses in the up direction (up pulses) and the down direction (down pulses). If the loading mechanism reaches the end of its range of travel before the total number of up pulses or down pulses have occurred, the pulses will cease when the control mechanism 26 is returned to its centered or off position by the operator, because the flow of pressurized air to the controller and the pneumatic valve control system will stop. For the vehicles described herein, values for the up pulses and down pulses parameters can range from 40 to 100 in some embodiments, though each system will require its own determination and adjustment of parameters.

In some embodiments, the control parameters also include a decay parameter, such that the fill and vent times change slightly with time. For example, the vent time may begin at a certain value when the window 74, 76 is first entered, and may then increase gradually until the end of the window 74, 76 is reached. An example of this is depicted in FIG. 5, where the time between vent pulses gradually increases in the fourth signal profile 35. The length of each of the vent pulses gradually increases in the fifth signal profile 36. A decay parameter of 1% is used in some embodiments.

Another parameter is the threshold pressure. The controller 30 detects the pressure in the pneumatic line to determine the direction of travel of the loading mechanism. The controller will not provide a pulsing signal unless the pressure as detected by the transducer is above the threshold pressure.

In some vehicles, an up limit parameter will be entered which is the voltage from the sensor at the upper limit of the range of travel of the loading mechanism. A down limit parameter is the voltage from the sensor when the loading mechanism is at the lower limit of its range of travel.

In some vehicles, another parameter is a window over which the controller 30 will attempt to slow the motion of the cylinder. Examples of these windows are shown schematically in FIG. 6 as window 74 and window 76. In one embodiment, these windows are defined as a particular sensor voltage or range of voltages over which the controller 30 will signal the pneumatic control valves 44, 46 to release pressurized air.

In some embodiments, these windows 74, 76 do not extend all the way to the voltage associated with the actual end of travel of the hydraulic cylinder. For example, there may be a small gap between the end of window 74 and point 70, and from window 76 to point 72. This gap is a defined parameter.

Another parameter is the limit window which provides a tolerance around the up limit parameter, so that the controller will behave as though the up limit has been reached whenever the sensor voltage reaches a value within the limit window of the up limit. By providing a tolerance around the up limit, the system is less susceptible to stray voltage.

In one embodiment, these parameters are provided to the controller using a hand-held programmer 80, shown in FIG. 2. The programmer 80 includes a connector 82 that can be attached to and detached from the controller 30, a display 84, user input devices 86, an up button 88 and a down button 90. Using the user input devices and buttons 86-90, the user scrolls through the different parameters, using the up and down buttons to change the value from a predetermined value. The predetermined values are loaded into the programmer before providing the system to the user, and correspond to a typical solution for a particular vehicle.

As mentioned above, there are a variety of types of control mechanisms that operators use to run the loading functions of a refuse collection vehicle. Some activate the loading mechanism using a joystick that is capable of an entire range of positions. Some use a three way switch for up, down and off. In addition, some vehicles also have an automatic mode, where the operator simply pushes a single button to initiate a loading cycle. An on-board controller of the truck takes over and activates a three way valve that is separate from the three way valve accessible to the operator.

Figure 8:
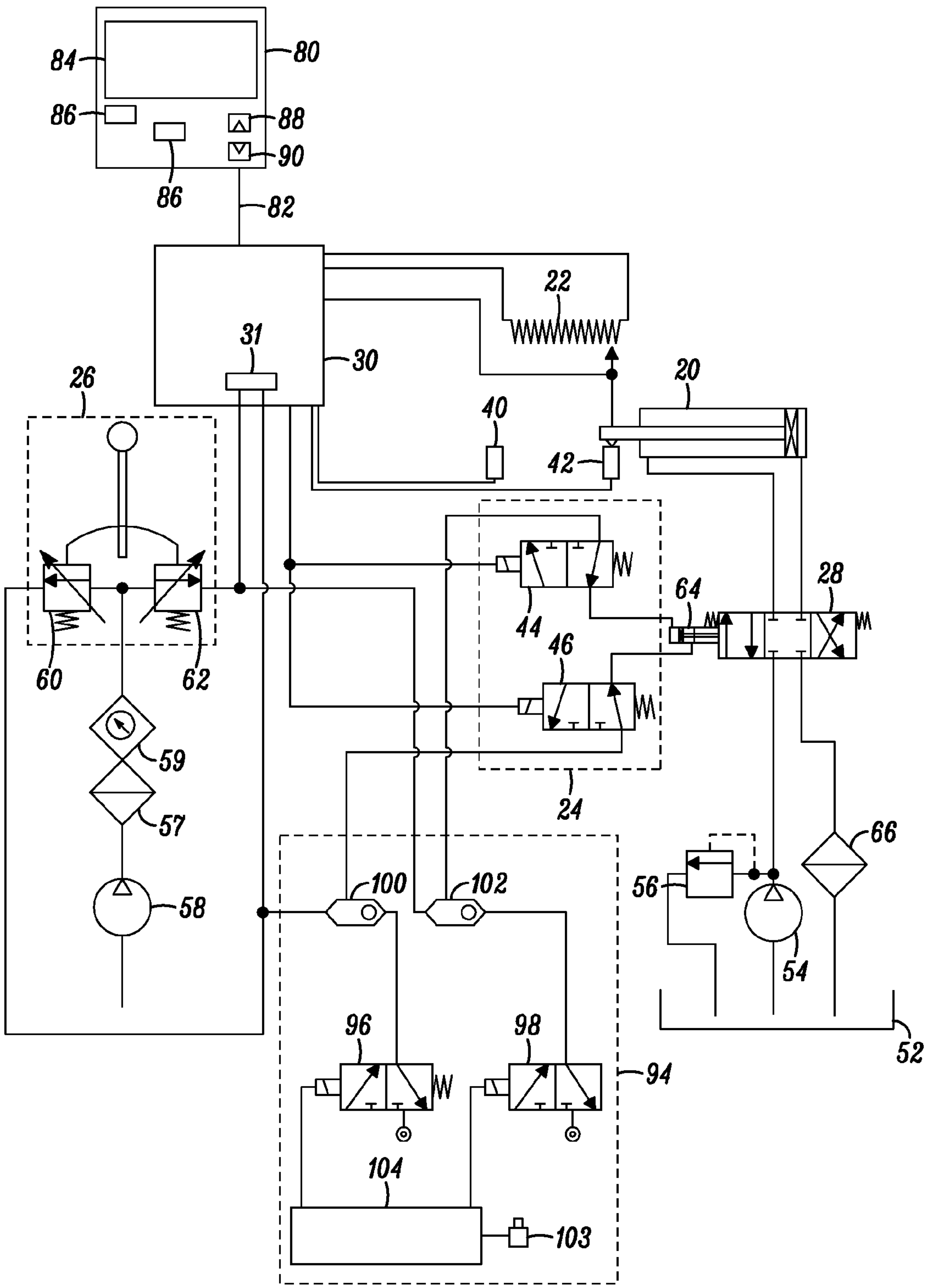
FIG. 8 is a hydraulic, pneumatic and electronic schematic of another embodiment of a hydraulic actuator control system constructed according to the principles of the present invention, including circuitry related to automatic loading controls.

FIG. 8 illustrates a schematic of the hydraulic actuator control system similar to FIG. 4, where identical reference numbers refer to identical components. The system of FIG. 8 shows an automatic loading subsystem 94 including two three way, normally closed valves 96 and 98, two shuttle valves 100 and 102 and the truck's onboard controller 104. When the operator pushes a button 103 to activate the automatic loading cycle, the trucks onboard controller 104 sends a signal to the valve 96 that activates upward motion, which in turn opens the shuttle valve 100, which sends air onto to pneumatic valve system 24. After the upward portion of the loading cycle is complete, the onboard controller 104 sends a signal to the valve 98 to initiate the downward portion of the loading cycle. The valve 98 opens the shuttle valve 102, which sends air onto pneumatic valve system 24.

APPLICATION EXAMPLES

The application of the hydraulic actuator control system to a variety of refuse collection vehicles will now be described. These applications are merely examples of how the hydraulic actuator control system can work in a few specific refuse collection vehicles. There are many different varieties of refuse collection vehicles with many different configurations for loading refuse. The hydraulic control system can be applied to and catered to many different refuse collection vehicles and loading configurations. The full variety of features of these vehicles, their different loading systems, and the catering of the hydraulic control system will not be discussed herein, but rather the configuration of a few specific examples will be described.

Side Loading Recycling Vehicle

A side loading recycling vehicle, such as vehicle 14 shown in FIG. 3, includes collection buckets 16. Throughout the collection route, the operator places items into the collection buckets 16. The unloading cycle starts with the collection buckets 16 at street level. When the operator wants to dump the collection buckets 16 into the hopper of the vehicle 14, the operator puts a three position manual air valve into the up position. This three position manual air valve is used instead of the joystick-type controller 26 shown in FIG. 4. The signal from the three position manual air valve is provided to the pneumatic system 24, which in turn actuates the hydraulic valve on an up/down cylinder.

For the side loading recycling vehicle, the hydraulic cylinder mechanism both brings the buckets upward and opens the hopper's top door during its cycle. As the cylinder starts to retract, the top door is opened and the bucket is moved up the track 17. A bucket guide is attached to the bucket on each side and sits in each of the tracks 17. The top door opens fully as the bucket approaches the curved portion 18. Once the bucket guide moves into the curved portion 18, a proximity sensor is activated. The proximity sensor stays in an on state during the entire time that the bucket guides are positioned in the curved portion 18 of the tracks 17. That proximity sensor signal tells the controller 30 of the hydraulic actuator control system to control the pneumatic valves 44, 46. An on/off pulsing control signal is therefore applied to the pneumatic valves 44, 46 that effectively drops the pressure in the pneumatic actuator 64 to a lower pressure. The hydraulic cylinder velocity is reduced by the reduction of pneumatic actuator pressure.

The on/off pulses are counted by the controller 30, and the controller stops pulsing after the pulse count reaches the value of the up pulses parameter. The buckets may reach the top end of the track 17 with the hydraulic cylinder fully extended before the pulse count is reached. In this case, the pulsing signal will stop when the controller mechanism 26 is returned to a centered position by the operator.

Alternatively, the hydraulic cylinder may not achieve its full stroke by the time the on/off pulses end. This may occur due to viscosity changes in the hydraulic fluid in cold weather, for example. In this case, the normally open design of the pneumatic valves 44, 46 will then provide the remainder of the full stroke.

The contents of the buckets have been dumped out by this point of the cycle. The operator now changes the position of the manual three position air valve to the down direction. Since the bucket guide is still in the curved area 18 of the track 17, the proximity sensor is still activated, so the controller limits the pressure fill rate of the pneumatic actuator 64 during the downward travel of the loading mechanism. This allows for a slow descent through the curved portion 18 of the track 17. Once the bucket guide is clear of the curved portion 18, the proximity sensor turns off, and the normal system pressure is applied to the pneumatic actuator 64, and the buckets accelerate to the bottom of the track 17. The operator centers the manual valve there, and the operator returns to their sorting and retrieving recyclables function.

In this example, there is no pulsing control signal provided at the downward end of the range of travel of the buckets.

Parameters that are used for this side loading recycler include the up vent, up fill, down vent, down fill, up pulses and down pulses parameters, as well as the decay parameter and threshold pressure. The side loading recycler does not use the window parameters, as the vehicle does not employ a sensor that provides a voltage indicating position of the loading mechanism.

Side Loading Garbage Truck

Another example of a side loading garbage truck is shown in FIG. 1 and has a vehicle body and arm arrangement designed to pickup residential cans where the refuse cans are typically supplied by the refuse company or government agency. The cans are relatively uniform in diameter within a range the grabber arms 4 on the loader arm 5 can grab and hold.

The loading cycle of such a truck can be run by a joystick, which is typically in the driver's cab, from where the operator can see the curb side of the truck well. The operator guides the arm to the where the refuse can is, pushes the gripper button, and grabs the can. The can is lifted slightly off the ground, pulled into the body, and then lifted in the up direction. As the loading cycle is described, reference will be made to components shown on the schematic drawing of FIG. 4, where appropriate. The hydraulic control system has a dual channel pressure transducer 31 that provides a signal as to what the joystick is doing. Also a linear sensor 22 provides the controller with a voltage that represents the position of the hydraulic cylinder. When the position voltage from the linear sensor 22 approaches the value of the limit window parameter and the transducer indicates that the loading mechanism is traveling at a speed above a certain preset speed, the controller 30 begins supplying a control signal to the pneumatic valve system 26.

In the up direction, it is important not to slow down the arm too much, to prevent inadvertent dumping of some of the garbage outside of the collection bin. The pulsing control signal is stopped when the first of two things occur: either the end of the stroke window is reached or the total number of up pulses is reached. In either event, the pneumatic valves go back to their normally open position and full system joystick control is returned. If the operator wants to shake the can while it is in the up position, he or she now has full flow control and won't be hampered by a signal from the controller 30 provided he or she does not retract the arm more than half the way back down. This ability to shake the can is important for the operator as some customers pack their garbage into the can tightly and because below freezing temperatures can make the garbage stay in the can.

Once the operator has determined that the can is empty, the joystick is directed to the down position. The controller knows of the direction change and is monitoring the position sensor. When the position sensor hits the down window, a pulsing signal is provided by the controller 30 to the pneumatic valve system 24. The pulsing signal drops the pressure in the pneumatic actuator 64 to decelerate the end of the downward travel.

The decay parameter causes the reduced pressure to tail off slowly, allowing the system to absorb more energy without adding spikes in the hydraulics system or the mechanical system.

Once the loading mechanism has either achieved the down position window or the maximum number of pulses, the signal from the controller 30 is turned off, and full control by the joystick is allowed.

In the hydraulic control system for this side loading garbage truck, the resistors in the controller 30 indicate preset limits on the speed of the arm. If the joystick is already operating below a preset pressure, the arm is not moving very quickly, and so the controller does not provide the pulsing signal. In this situation, the operator is already going slowly, and there is not a need to protect the system. Once the pressure exceeds the limit set by the resistors, the controller reacts with a pulsing signal, even if the pressure then decays below that level due to the pulsing signal. In one example, the resistor settings require 65 psi.

Front Loading Garbage Truck

A front loading garbage truck is shown in FIG. 2. Some only pick up large dumpsters. Others have a "carry can" option where the arms or forks carry a collection can and individual refuse cans are dumped into it, and when full, the collection can is dumped into the main body and compacted.

The hydraulic actuator control system for a front loader garbage truck has very low resistor settings, for example, 10 psi. As a result, the controller 30 provides a pulsing signal anytime the loading mechanism is approaching the top or bottom of a stroke. Once the loading mechanism has been stopped by the pulsing signal, the mechanism may not be in their final ending position. Once stopped, the system is able to move to the final position without interruption by controller 30. Controller 30 will not provide a pulsing signal again until the loading mechanism has moved more than 40% of the total travel.

The front loader truck is controlled typically by a joystick. The front loader truck can also be controlled by the truck's on-board controller after the operator has confined the load and after the operator pushes a button activating the instructed automatic loading controls. The actions of the controller 30 and many of the relevant parameters for the front loading garbage truck are very similar to the actions for the side loading garbage truck described above.

The hydraulic actuator control system of the present invention allows a hydraulic actuator, such as a hydraulic cylinder, to automatically be slowed down prior to impacting the end of its range of travel. It should also be noted that this system can readily be adapted for use with more than one actuator or cylinder. This system has several advantageous characteristics. For one, it can be readily adapted to existing vehicles that already have a pneumatic control system for a hydraulic cylinder.

Furthermore, the system is robust to failure, such that if some failure occurs in the sensor 22, controller 30, or pneumatic control valves 24 the refuse loader will likely remain operational. Because the pneumatic control valves 24 are biased in a normally open position and merely reduce the pressure applied to the pneumatic actuator 64 when acted upon by the controller 30, their failure or the failure of the controller 30 will only cause the cylinder-slowing functionality to be lost but primary function will remain. In addition, the system provides this type of control without requiring the expense and difficulty of proportional electro-hydraulic controls, which typically are very sensitive to contamination, are more expensive to manufacture, and which are more difficult to diagnose and repair.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

The above specification provides a complete description of the structure and use of the invention. Since many of the embodiments of the invention can be made without parting from the spirit and scope of the invention, the invention resides in the claims.

What is claimed is:

1. A mobile refuse collection vehicle comprising:

(i) a source of pressurized hydraulic fluid and a source of pressurized air;

(ii) a lifter apparatus configured to interface with a refuse container;

(iii) a hydraulic actuator configured to move the lifter apparatus through a range of operation;

(iv) an operator control for controlling motion of the hydraulic actuator, the operator control configured to selectively connect the source of pressurized air to one or more pneumatic actuators for selectively actuating a hydraulic control valve in response to motion of the operator control, the hydraulic control valve configured to selectively connect the source of pressurized hydraulic fluid to the hydraulic actuator to cause motion of the hydraulic actuator;

(v) a position sensor configured to sense the position of the hydraulic actuator and to transmit a signal related to the position;

(vi) one or more pneumatic control valves fluidly connected between the operator control and a pneumatic actuator, each pneumatic control valve being configured to selectively modify pressurized air from the operator control to the pneumatic actuator in response to an electrical signal; and (vii) an electronic controller configured to receive the signal from the position sensor, and when the signal indicates that the hydraulic actuator is near a first position, to selectively actuate the pneumatic control valve to cause the hydraulic linear actuator to travel more slowly until reaching the first position.

2. The mobile refuse collection vehicle of claim 1, where the pneumatic control valve is a pulse width modulated valve.

3. The vehicle of claim 1, where the modification of pressurized air control signal pressure allows a hydraulic control valve to shift and where the shifting of the hydraulic control valve restricts flow of pressurized hydraulic fluid to the hydraulic actuator.

4. The vehicle of claim 3 where a biasing spring shifts the hydraulic control valve when the pressurized air control signal pressure is modified.

5. The vehicle of claim 3 where the pneumatic control valve modifies pressure in response to an electrical signal received from the electronic controller.

6. The vehicle of claim 3 where the controller alternately transmits an electrical signal to the pneumatic control valve and ceases transmitting an electrical signal to the pneumatic control valve in order to modulate a release of pressure by the pneumatic control valve.

7. The vehicle of claim 6 where transmitting an electrical signal for a relatively greater proportion of time causes a relatively greater release of pressure by the pneumatic control valve.

8. The vehicle of claim 1 wherein the hydraulic actuator is a hydraulic cylinder and the portion is near an end of a range of motion of the hydraulic cylinder, and where the electronic controller is calibrated to the sensor by placing the hydraulic cylinder at the end of its range of motion and signaling the electronic controller that the sensor signal at that time corresponds to the end of the range of motion of the hydraulic cylinder.

9. The vehicle of claim 8 where a window parameter is defined and stored in the electronic controller, and the window parameter represents the condition where the electronic controller will begin controlling the pneumatic control valve and where the electronic controller will end controlling the pneumatic control valve.

10. The vehicle of claim 9 where the electronic controller transmits a control signal to the pneumatic control valve when the signal from the sensor indicates the hydraulic cylinder is within the window parameter.

11. The vehicle of claim 10 where the control signal to the pneumatic control valve alternates between an "on" state and an "off" state.

12. The vehicle of claim 11 where the duration of the "on" state and the "off" state remain constant throughout the duration of the window parameter.

13. The vehicle of claim 11 where the duration of the "on" state and the "off" state change progressively throughout the duration of the window parameter.

* * * * *